United States Patent
Tomimatsu et al.

[11] Patent Number: 5,989,740
[45] Date of Patent: Nov. 23, 1999

[54] MOLTEN CARBONATE FUEL CELL

[75] Inventors: Norihiro Tomimatsu, Kawasaki; Hideyuki Ohzu; Kazuaki Nakagawa, both of Yokohama; Yoshihiro Akasaka, Kawasaki, all of Japan

[73] Assignee: Kabushiki Kaisha Toshiba, Kawasaki, Japan

[21] Appl. No.: 09/042,807

[22] Filed: Mar. 17, 1998

[30] Foreign Application Priority Data

Mar. 17, 1997 [JP] Japan .................................. 9-062867
Mar. 12, 1998 [JP] Japan .................................. 10-061185

[51] Int. Cl.⁶ ........................... H01M 8/14; H01M 2/00; H01M 2/02
[52] U.S. Cl. ................. 429/16; 429/34; 429/35; 429/37
[58] Field of Search ................... 429/16, 34, 35, 429/37

[56] References Cited

U.S. PATENT DOCUMENTS

| | | | |
|---|---|---|---|
| 3,615,845 | 10/1971 | Gray | 429/34 |
| 5,206,095 | 4/1993 | Donado et al. | 429/16 |
| 5,582,624 | 12/1996 | Jantsch et al. | 29/623.1 |
| 5,595,832 | 1/1997 | Tomimatsu et al. | 429/16 |
| 5,643,690 | 7/1997 | Tateishi et al. | 429/34 |

*Primary Examiner*—Kathryn Gorgos
*Assistant Examiner*—Wesley A. Nicolas
*Attorney, Agent, or Firm*—Oblon, Spivak, McClelland, Maier & Nuestadt, P.C.

[57] ABSTRACT

A molten carbonate fuel cell of high performance and long life, which is capable of preventing the corrosion at the contacting portion between collector plates (in particular, an oxidizing gas-side collector plate) and the interconnector so as to suppress an increase of contact resistance. This molten carbonate fuel cell comprises, a unit cell comprising an electrolyte body formed of a porous body impregnated therein with a mixed carbonate containing two or more kinds of carbonate mixed in a desired mixing ratio, a cathode disposed on one main surface of the electrolyte body, and an anode disposed on the other main surface of the electrolyte body, corrugated collector plates, each disposed on a surface of the anode and on a surface of the cathode, and interconnectors, each disposed on a surface of each of the collector plates, wherein a substance which is capable of reacting with the mixed carbonate at an operation temperature of the fuel cell thereby to change a composition ratio of the mixed carbonate is deposited on a surface of at least one member selected from the collector plate and the interconnector.

20 Claims, 4 Drawing Sheets

MOLTEN CARBONATE FUEL CELL

BACKGROUND OF THE INVENTION

This invention relates to a molten carbonate fuel cell, and in particular to a molten carbonate fuel cell wherein the collector plate and/or the interconnector thereof is improved.

Various kinds of fuel cells have been proposed and commercially utilized. Among them, a molten carbonate fuel cell is now extensively studied and being developed because it is advantageous in power generation efficiency as well as it is capable of utilizing coal gas as a fuel gas.

This molten carbonate fuel cell is constructed such that a plurality of unit cell, each comprising an anode (a fuel electrode), a cathode (an air electrode) and an electrolyte body, are superimposed one upon another with a collector plate being interposed between the unit cells, and an interconnector is interposed between the collector plates to partition the unit cells. There is also disposed in the fuel cell a separator comprising a couple of edge-sealing plates for holding therebetween the peripheral portion of the electrolyte body. Thus, these edge-sealing plates are contacted with the peripheral portion of the electrolyte body so as to form a wet seal and to shield the unit cells from the outer atmosphere.

By the way, the collector plate (in particular, which is disposed on the oxidizing gas-side) and the interconnector are rendered to be covered with a film of highly corrosive molten carbonate solution which has been exuded from the air electrode during the operation of the fuel cell. Because of this, the collector plate is conventionally formed of stainless steel having an excellent corrosion resistance. The stainless steel conventionally employed is mainly SUS310S and SUS316L.

However, the collector plate formed of stainless steel is accompanied with a problem that a corrosion product layer exhibiting a high electric resistance is caused to deposit on the surface of the collector plate during the operation of the fuel cell. Therefore, when the fuel cell is operated for a long period of time extending over 1,000 hours, the deposition of corrosion product layer is grown up increasing the electric resistance thereof. Since the electromotive force which is output from the fuel cell is directly influenced by a contact resistance between the collector plate and the interconnector, any increase in contact resistance would lead to a prominent deterioration of the performance of the fuel cell. Namely, the deposition of the corrosion product on the collector plate or interconnector becomes a hindrance in improving the performance and life of a fuel cell.

BRIEF SUMMARY OF THE INVENTION

Accordingly, an object of the present invention is to prevent the generation of corrosion at the contacting portion between the collector plate (in particular, which is disposed on the oxidizing gas-side) and the interconnector so as to suppress an increase of contact resistance between the collector plate and the interconnector, thereby making it possible to provide a molten carbonate fuel cell of high performance and long life.

Namely, according to the present invention, there is provided a molten carbonate fuel cell which comprises;

a unit cell comprising an electrolyte body formed of a porous body impregnated therein with a mixed carbonate containing two or more kinds of carbonate mixed in a desired mixing ratio, a cathode disposed on one main surface of the electrolyte body, and an anode disposed on the other main surface of the electrolyte body;

corrugated collector plates, each disposed on a surface of the anode and on a surface of the cathode; and interconnectors, each disposed on a surface of each of the collector plates;

wherein a substance which is capable of reacting with the mixed carbonate at an operation temperature of the fuel cell to change a composition ratio of the mixed carbonate is deposited on the surface of at least one member selected from the collector plate and the interconnector.

According to the present invention, there is further provided a molten carbonate fuel cell which comprises;

a unit cell comprising an electrolyte body formed of a porous body impregnated therein with a mixed carbonate containing lithium carbonate and at least one carbonate selected from potassium carbonate and sodium carbonate, a cathode disposed on one main surface of the electrolyte body, and an anode disposed on the other main surface of the electrolyte body;

corrugated collector plates, each disposed on a surface of the anode and on a surface of the cathode; and interconnectors, each disposed on a surface of each of the collector plates;

wherein a substance which is capable of reacting with the lithium carbonate in the mixed carbonate at an operation temperature of the fuel cell to produce a solidified body of lithium composite is deposited on the surface of at least one member selected from the collector plate and the interconnector.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

This invention will be further explained with reference to FIGS. 1 and 2 each showing a molten carbonate fuel cell according to the present invention.

Figure 1:
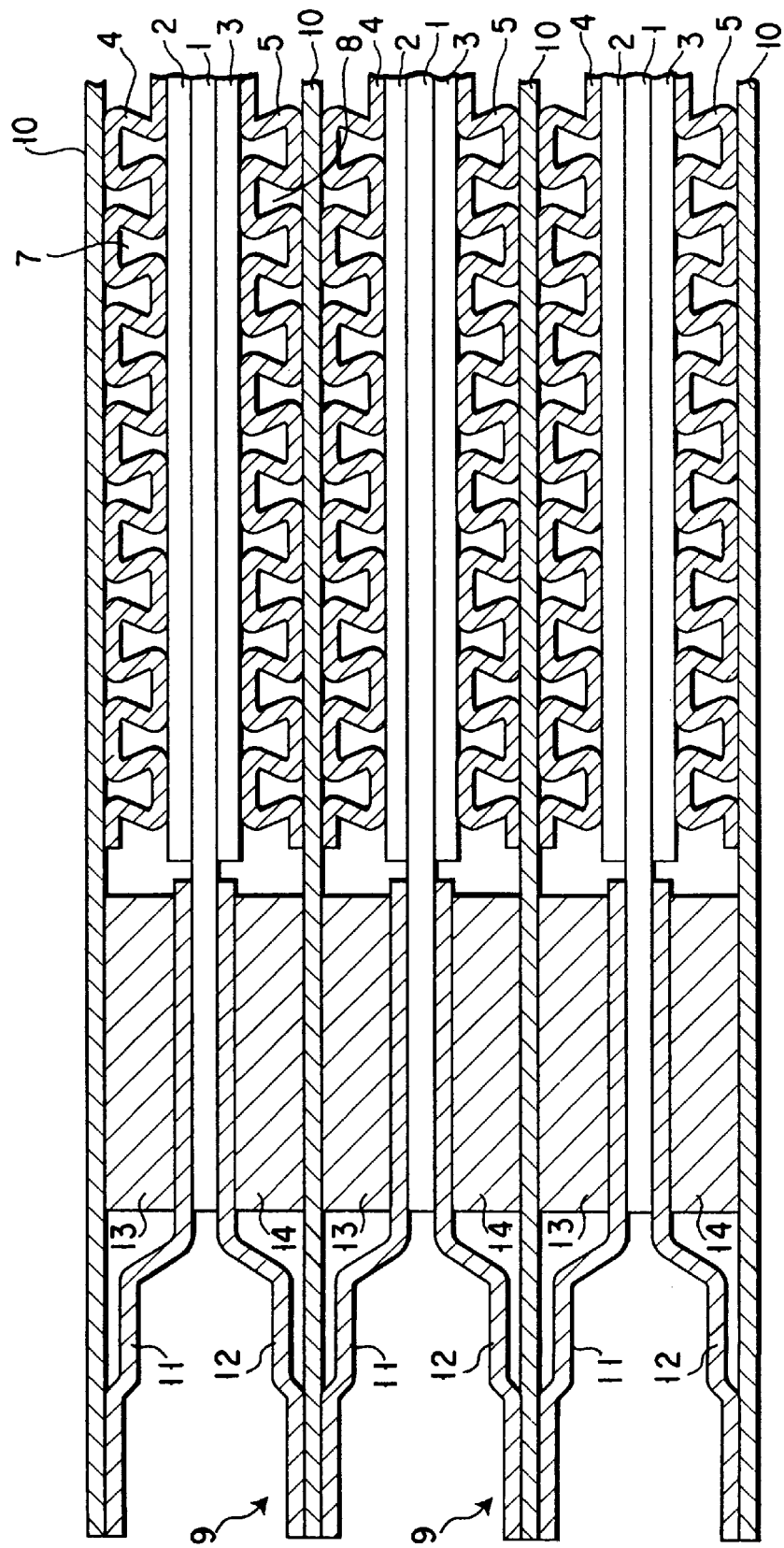
FIG. 1 is a cross-sectional view showing one embodiment of the molten carbonate fuel cell according to the present invention.

FIG. 1 shows a cross-sectional view of a portion of the molten carbonate fuel cell formed of a stacked structure of plural unit cells. FIG. 2 is a cross-sectional view showing a contacting portion between an oxidizing gas-side collector plate and an interconnector each constituting the fuel cell show in FIG. 1. An electrolyte body 1 is interposed between an anode (a fuel electrode) 2 and a cathode (an air electrode) 3. This electrolyte body 1 is formed of a porous body impregnated therein with an electrolyte comprising a mixed carbonate containing two or more kinds of carbonate mixed in a desired mixing ratio. Each unit cell is constituted by the electrolyte body 1, the anode 2 and the cathode 3. A collector plate 4 disposed on the fuel gas side and a collector plate 5 disposed on the oxidizing gas side are placed respectively on a surface of the anode 2 and a surface of the cathode 3 which are opposite to the surface with which the electrolyte body 1 is contacted.

Figure 2:
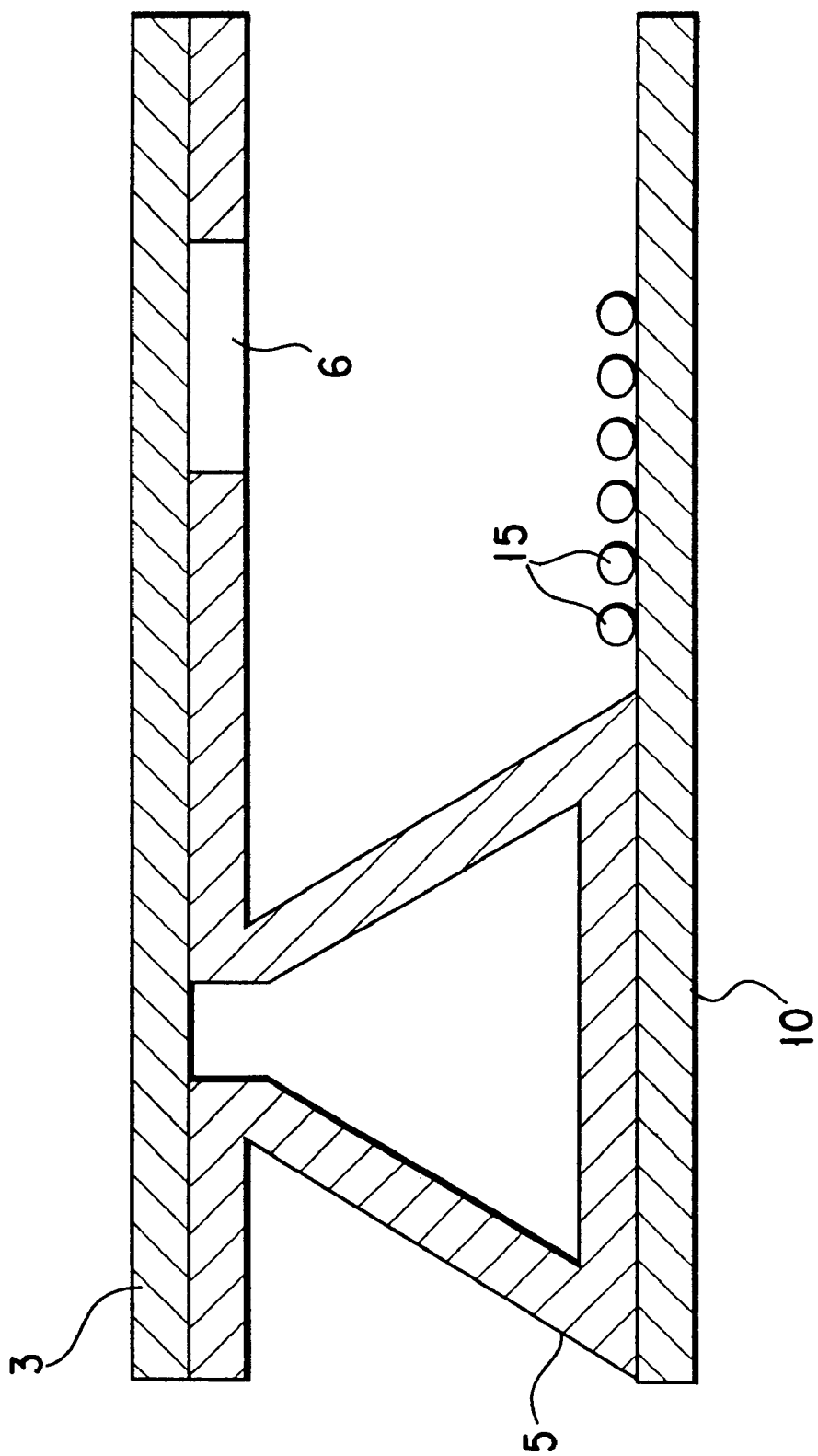
FIG. 2 is a cross-sectional view showing a contacting portion between an oxidizing gas-side collector plate and an interconnector each constituting the fuel cell shown in FIG. 1.

As shown in FIG. 2, the collector plate 4 and the collector plate 5 are provided respectively with a gas-feeding through-hole 6 at a portion where these plates 4 and 5 are contacted with the anode 2 and the cathode 3, respectively. The fuel gas is allowed to pass through a fluid passage 7 formed between the anode 2 and the collector plate 4. Whereas the oxidizer gas is allowed to pass through a fluid passage 8 formed between the cathode 3 and the collector plate 5. A separator is interposed between the stacked unit cells and designed to function as a partition for the unit cell. This separator is constituted by an interconnector 10 which separates the fluid passage 7 from the fluid passage 8, and a couple of edge-sealing plates 11 and 12 disposed in such a manner as to hold therebetween a peripheral portion of the electrolyte body 1.

These edge-sealing plates 11 and 12 are contacted with a peripheral portion of the electrolyte body 1, forming a wet seal which functions to shield the power-generating parts of the unit cell from the outer atmosphere. Further, these edge-sealing plates 11 and 12 are pressed toward each other at a bearing stress of 5 kg/cm$^2$ or less in general by a pair of springs 13 and 14 disposed at their holding portions, i.e. portions holding the peripheral portion of the electrolyte 1, thereby ensuring the wet seal mentioned above.

A substance, e.g., powder substance 15 is deposited on a surface of at least one member selected from the collector plates 4 and 5 and the interconnector 10 (for example, the interconnector 10) as shown FIG. 2. In particular, it is preferable that the substance is deposited on a surface of the interconnector 10 which is contacted with the collector plate 5 where an oxidizer gas is allowed to flow. The substance 15 is capable of reacting with the mixed carbonate at an operation temperature of the fuel cell to change a composition ratio of the mixed carbonate.

As a specific example of porous body constituting the electrolyte body 1, a porous body mainly constituted by lithium aluminate ($LiAlO_2$) may be employed.

As for the mixed carbonate, a mixture of lithium carbonate ($Li_2CO_3$) and potassium carbonate ($K_2CO_3$), a mixture of lithium carbonate ($Li_2CO_3$) and sodium carbonate ($Na_2CO_3$), or a mixture of lithium carbonate ($Li_2CO_3$), potassium carbonate ($K_2CO_3$) and sodium carbonate ($Na_2CO_3$) may be employed.

As for the electrolyte, it may be a composition which further comprises, in addition to the aforementioned mixed carbonate, an alkaline earth carbonate such as magnesium carbonate.

As for the anode 2 and the cathode 3, a porous body such as a sintered body of nickel-based alloy may be employed.

The collector plates 4 and 5 are formed of austenitic stainless steel for example. For example, a stainless steel comprising 10 to 27 wt % of Cr, 7.0 to 28 wt % of Ni, not more than 0.08 wt % of Co, not more than 2.0 wt % of Mn, not more than 1.5 wt % of Si and the balance of Fe, and containing not more than 0.1 wt % of unavoidable impurities may be employed. Typical examples of such a stainless steel are SUS310S and SUS316L both being excellent in high temperature strength and corrosion resistance.

As for the interconnector 10 and a couple of edge-sealing plates 11 and 12 constituting the separator 9, they may be formed from stainless steel for instance.

As for the fuel gas, a mixed gas consisting of hydrogen ($H_2$) and carbon dioxide ($CO_2$) may be used. As for the oxidizer gas, a mixed gas consisting of air or oxygen ($O_2$) and carbon dioxide ($CO_2$) may be used.

Next, a substance which is capable of reacting with the mixed carbonate at an operation temperature of the fuel cell thereby to change a composition ratio of the mixed carbonate will be explained in details. In this case, the expression of "to change a composition ratio of the mixed carbonate" means the phenomenon that the quantity of either one of the carbonates constituting the mixed carbonate is reduced (the quantity of the other one of the mixed carbonate is correspondingly increased) as compared with the initial state (preferably, a eutectic composition).

As for the examples of such a substance, oxides such as zirconia, titania, alumina, ferrite, or the like can be employed.

As for the method of depositing this substance, any of the following methods can be adopted.

(a) A method wherein the powder of the substance is dispersed in a solvent to prepare a paste, which is then coated on the surface of at least one member selected from the collector plates and the interconnector.

(b) A method wherein at least one member selected from the collector plates and the interconnector is dipped in a paste of the aforementioned (a) thereby depositing the substance on the surface of the at least one member.

(c) A method wherein the substance is deposited on the surface of at least one member selected from the collector plates and the interconnector by means of a vapor deposition method or a spray coating method.

The quantity of the substance to be deposited should preferably be in the range of 0.5 to 100 mg/cm$^2$, more preferably not more than 30 mg/cm$^2$ based on the weight per unit area of at least one member selected from the collector plates and the interconnector. Because, if the deposition quantity of the substance is less than 0.5 mg/cm$^2$, it may become difficult to change the composition ratio of the corrosive molten mixed carbonate which has been exuded to the contacting portion between the collector plates and the interconnector. On the other hand, if the deposition quantity of the substance is too much, a superfluous quantity of the substance is caused to be deposited in the gas flow passage, thus preventing gas flow and inviting a negative effect.

The average particle diameter of the powdery substance to be employed in the aforementioned methods (a) and (b) should preferably be in the range of 0.01 to 50 μm. If the average particle diameter of the powdery substance is too large, the reaction area thereof relative to the carbonate would become too small. On the other hand, if the average particle diameter of the powdery substance is too small, the handling of the powdery substance would become difficult.

As explained above, since the molten carbonate fuel cell according to this invention is constructed such that a powdery substance which is capable of reacting with the mixed carbonate at an operation temperature of the fuel cell so as to change a composition ratio of the mixed carbonate is deposited on the surface of at least one member selected from the collector plates 4 and 5 and the separator 9 (for example, the interconnector 10 of the separator 9), it is possible to improve the performance and life of the molten carbonate fuel cell.

Namely, the electrolyte containing a molten mixed carbonate and existing in the electrolyte body is exuded out of the cathode during the operation of the fuel cell, and then flows, via the gas-feeding through-hole 6 of the oxidizer side collector 5, into the interconnector 10 and the collector plate 5. The molten mixed carbonate thus exuded is highly corrosive to the member such as the collector body. Therefore, since the aforementioned substance is deposited on the collector body, the molten mixed carbonate is caused to react with the substance, thereby making it possible to change the composition ratio of the initial state. As a result, the melting point of the molten mixed carbonate is caused to rise. When the melting point of the molten mixed carbonate becomes higher than the operation temperature of the fuel cell, the electrolyte introduced into the interconnector 10 and the collector 5 is solidified, so that the corrosion (which invites an increase in electric resistance) of the contacting portion between the interconnector 10 and the collector 5 can be inhibited, making it possible to avoid an electric loss at this contacting portion. Therefore, it is possible to improve the performance and life of the molten carbonate fuel cell.

Figure 3:
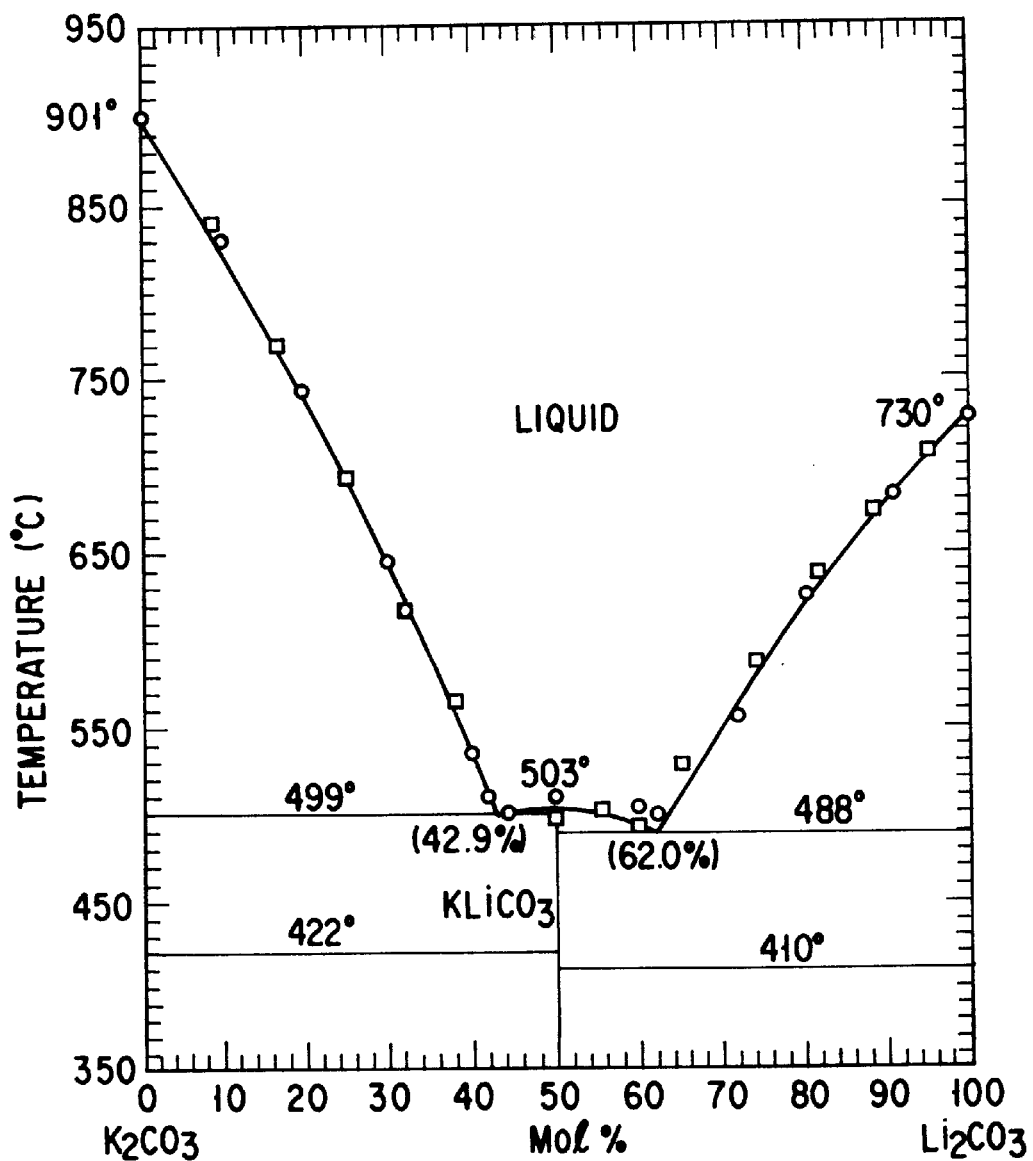
FIG. 3 is a graph illustrating the relationship between the composition of a mixed alkali carbonate consisting of $Li_2CO_3$ and $K_2CO_3$, and the melting point thereof.

The mixed alkali carbonate to be employed as an electrolyte and comprising lithium carbonate ($Li_2CO_3$) and potassium carbonate ($K_2CO_3$) can be transformed producing a eutectic salt when the composition ratio thereof is constituted by 62 mol. % of $Li_2CO_3$ and 38 mol. % of $K_2CO_3$. As a result, the mixed alkali carbonate exhibits the lowest melting point (488° C.) as shown in the phase diagram of FIG. 3. Namely, when the composition ratio between $Li_2CO_3$ and $K_2CO_3$ is shifted from the composition ratio of this eutectic salt, the melting point of the mixed alkali carbonate would be increased. When zirconia is employed as the powdery substance 15, zirconia reacts with lithium carbonate in the mixed alkali carbonate at a temperature of 650° C., i.e. the operation temperature of the fuel cell, whereby generating lithium zirconate as shown in the following formula (1). As a result of this reaction, the ratio of $K_2CO_3$ in the composition of the mixed alkali carbonate deposited on the collector (for example, the oxidizer side collector 5) as well as on the interconnector 10 becomes excessive as compared with the composition ratio of the eutectic salt, whereby the composition ratio between $Li_2CO_3$ and $K_2CO_3$ is shifted from that of the eutectic salt (it is shifted to the left side from the point of eutectic salt shown in FIG. 3). As a result, the melting point of the resultant composition is caused to exceed over 650° C. Due to this reaction, the mixed alkali carbonate (electrolyte) deposited on the oxidizer side collector 5 as well as on the interconnector 10 is caused to solidify, thus making it possible to suppress the corrosion of the contacting portion between the interconnector 10 and the collector 5.

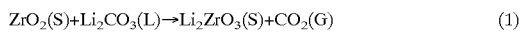

$$ZrO_2(S)+Li_2CO_3(L) \rightarrow Li_2ZrO_3(S)+CO_2(G) \qquad (1)$$

Next, another example of the molten carbonate fuel cell according to the present invention will be explained.

This molten carbonate fuel cell is provided with an electrolyte body formed of a porous body impregnated therein with a mixed carbonate containing lithium carbonate and at least one carbonate selected from potassium carbonate and sodium carbonate. This molten carbonate fuel cell is also featured in that a substance which is capable of reacting with the lithium carbonate in the mixed carbonate at an operation temperature of the fuel cell thereby to produce a solidified body of lithium composite is deposited on the surface of at least one member selected from the collector plates 4 and 5 and the interconnector 10 (for example, interconnector 10) shown in FIG. 1.

As for the examples of such a substance, oxides such as zirconia, titania, alumina, ferrite, or the like can be employed.

As for the method of depositing this substance, any of the aforementioned methods (a), (b) and (c) can be adopted.

The quantity of the substance to be deposited should preferably be in the range of 0.5 to 100 mg/cm², more preferably not more than 30 mg/cm² based on the weight per unit area of at least one member selected from the collector plates and the interconnector. Because, if the deposition quantity of the substance is less than 0.5 mg/cm², it may become difficult to solidify the highly corrosive molten mixed carbonate which has been exuded to the contacting portion between the collector plates and the interconnector. On the other hand, if the deposition quantity of the substance is too much, a superfluous quantity of the substance is caused to be deposited in the gas flow passage, thus obstructing gas flow and inviting a negative effect.

As explained above, since the molten carbonate fuel cell according to this invention is constructed such that a substance which is capable of reacting with the lithium carbonate in the mixed carbonate at an operation temperature of the fuel cell to produce a solidified body of lithium composite is deposited on the surface of at least one member selected from the collector plates 4 and 5 and the interconnector 10 (for example, interconnector 10), it is possible to improve the performance and life of the molten carbonate fuel cell.

Namely, the electrolyte containing a mixed carbonate containing lithium carbonate and at least one carbonate selected from potassium carbonate and sodium carbonate and being incorporated in the electrolyte body is exuded out of the cathode during the operation of the fuel cell, and then flows, via the gas-feeding through-hole 6 of the oxidizer side collector plate 5, into the interconnector 10 and the collector plate 5. The molten mixed carbonate thus exuded is highly corrosive to the member such as the collector plate. Therefore, since the aforementioned substance is deposited in advance on at least one member selected from the collector plate and interconnector, lithium carbonate in the molten mixed carbonate is caused to react preferentially with the substance to produce a stable solidified body of lithium composite (for example, a lithium composite oxide). As a result, the ratio of highly corrosive lithium carbonate in the molten mixed carbonate can be extremely reduced. Therefore, the corrosion (which invites an increase in electric resistance) of the contacting portion between the interconnector 10 and the collector 5 can be suppressed, making it possible to avoid an electrical loss at this contacting portion. Therefore, it is possible to improve the performance and life of the molten carbonate fuel cell.

When zirconia is employed as the powdery substance, zirconia reacts with lithium carbonate in the mixed alkali carbonate at a temperature of 650° C., i.e. the operation temperature of the fuel cell, whereby generating a stable solidified body of lithium zirconate as shown in the aforementioned formula (1). As a result of this reaction, the ratio of highly corrosive lithium carbonate in the composition of the molten mixed alkali carbonate can be extremely reduced.

A preferable example of this invention will be explained as follows.

(EXAMPLE 1)

First of all, a portion of the interconnector (SUS310S 300 μm in thickness) to be contacted with the oxidizer side collector was covered with a mask, and then, the surface of the interconnector was coated with a paste comprising zirconia powder 0.2 μm in average particle diameter which was dispersed in ethanol. The paste was then dried to obtain the interconnector deposited thereon with zirconia powder at a density of 8 mg/cm$^2$. At this time, the zirconia powder was deposited on the surface of the interconnector which is contacted with a collector plate where an oxidizer gas is allowed to flow. After the mask was removed, the interconnector was assembled together with the collector plate made of SUS310S thereby fabricating a laminated fuel cell as shown in FIG. 1. Then, the resultant stacked fuel cell was placed in a power generating apparatus.

The electrolyte body which was built in the stacked fuel cell was formed of a porous body mainly formed of $LiAlO_2$ and impregnated therein with a mixed alkali carbonate ($Li_2CO_3$: 62 mol. % and $K_2CO_3$: 38 mol. %).

(COMPARATIVE EXAMPLE 1)

First of all, an interconnector (SUS310S 300 μm in thickness) which was not deposited with oxide powder and a collector plate made of SUS310S were assembled together thereby fabricating a stacked fuel cell as shown in FIG. 1. Then, the resultant laminated fuel cell was placed in a power generating apparatus.

As for the electrolyte body to be built in the stacked fuel cell, the same kind of porous body as employed in Example 1 was employed.

As a purging gas, a gas mixture consisting of 50 vol. % of carbon dioxide gas and the balance of nitrogen gas was allowed to flow into the power generating apparatuses each housing therein the aforementioned stacked fuel cell of Example 1 and Comparative Example 1. Thereafter, following the ordinary temperature-rising procedures of fuel cell, a fuel gas ($H_2$) was fed to the passage formed between the anode and the collector body, and at the same time, an oxidizer gas (air or $CO_2$) was fed to the passage formed between the cathode and the collector plate, after which the temperature of the fuel cell was allowed to increase up to the 650° C., i.e. a power-generating temperature, thereby effecting a power generation. Further, a power generation was performed at a current density of 150 mA/cm$^2$ for 1,000 hours while applying a bearing stress of 3 kg/cm$^2$ to the edge-sealing plates. Then, an increase in internal resistance during the power generation was investigated, the results being shown in FIG. 4.

Figure 4:
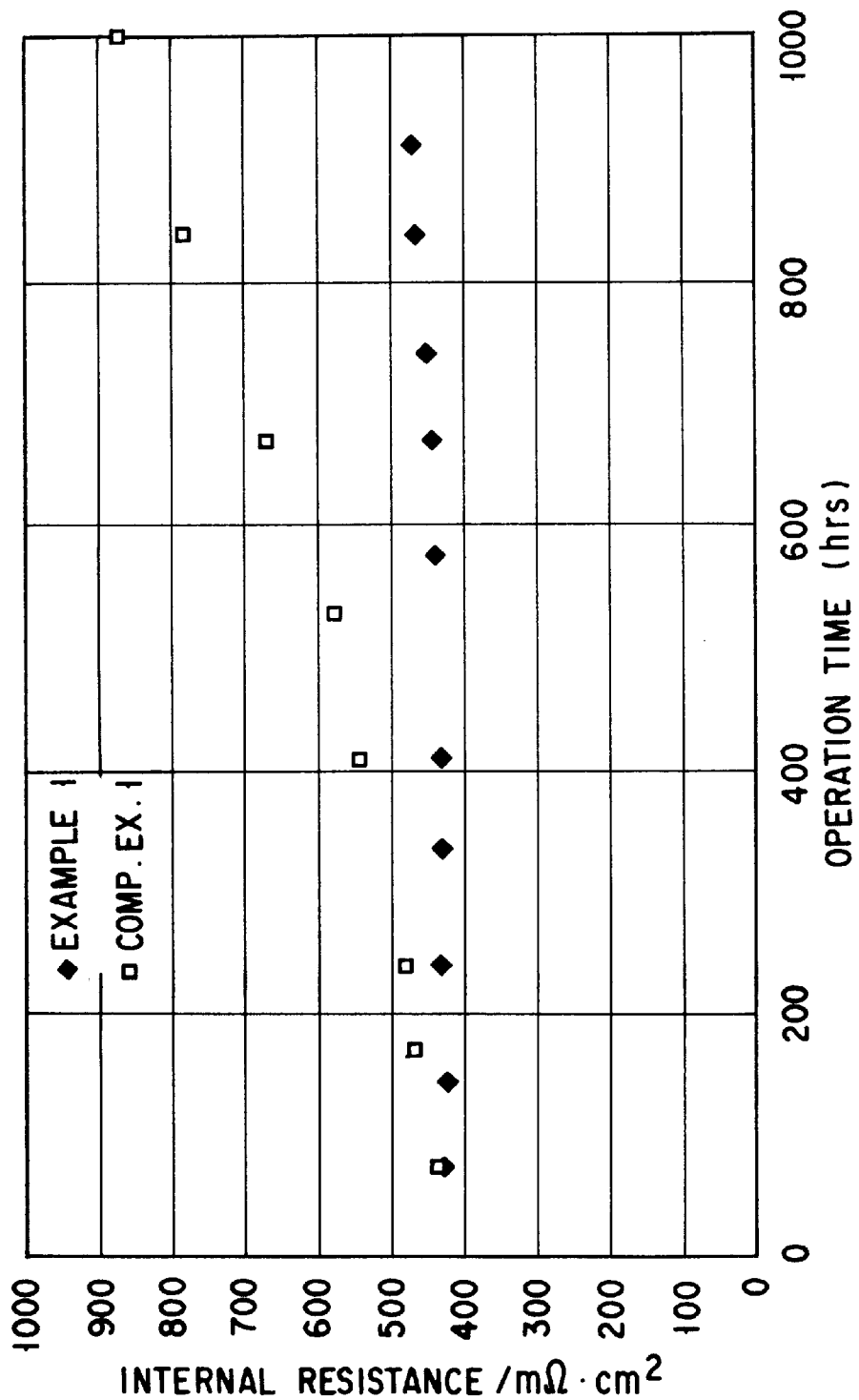
FIG. 4 is a graph illustrating the relationship between the operation time of fuel cell and the internal resistance in the fuel cells of Example 1 and Comparative Example 1.

As seen from FIG. 4, the fuel cell according to Example 1 indicated an increase of 100 Ω·cm$^2$ or less in internal resistance during the continuous operation of 1,000 hours, thus suggesting that an increase in resistance due to the corrosion by the electrolyte can be sufficiently suppressed.

By contrast, in the case of the fuel cell according to Comparative Example 1, it indicated an increase of 400 Ω·cm$^2$ or more in internal resistance during the continuous operation of 1,000 hours, thus manifesting a prominent increase in resistance.

As explained above, it is possible according to this invention to provide a molten carbonate fuel cell of high performance and long life, which is capable of preventing the collector plate and the interconnector from being corroded by an electrolyte exuded from the electrode so as to suppress an increase of contact resistance between the collector plate and the interconnector.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A molten carbonate fuel cell which comprises;
a unit cell comprising an electrolyte body formed of a porous body impregnated therein with a mixed carbonate containing two or more kinds of carbonate mixed in a desired mixing ratio, a cathode disposed on one main surface of said electrolyte body, and an anode disposed on the other main surface of said electrolyte body;
corrugated collector plates, each disposed on a surface of said anode and on a surface of said cathode; and
interconnectors, each disposed on a surface of each of said collector plates;
wherein a substance which is capable of reacting with said mixed carbonate at an operation temperature of the fuel cell to change a composition ratio of said mixed carbonate is deposited on the surface of at least one member selected from said collector plate and said interconnector.

2. The fuel cell according to claim 1, wherein said mixed carbonate comprises lithium carbonate and at least one carbonate selected from potassium carbonate and sodium carbonate.

3. The fuel cell according to claim 1, wherein said electrolyte further contains an alkaline earth carbonate.

4. The fuel cell according to claim 1, wherein said at least one member is formed of stainless steel.

5. The fuel cell according to claim 4, wherein said stainless steel is formed of a composition comprising 10 to 27 wt % of Cr, 7.0 to 28 wt % of Ni, not more than 0.08 wt % of Co, not more than 2.0 wt % of Mn, not more than 1.5 wt % of Si and the balance of Fe, and containing not more than 0.1 wt % of unavoidable impurities.

6. The fuel cell according to claim 1, wherein said substance is deposited on a surface of said interconnector which is contacted with said collector plate where an oxidizer gas is allowed to flow.

7. The fuel cell according to claim 1, wherein said substance is deposited on a surface of said at least one member at a ratio ranging from 0.5 to 100 mg/cm$^2$, based on the weight per unit area of said at least one member.

8. The fuel cell according to claim 1, wherein said substance is a powdery substance.

9. The fuel cell according to claim 8, wherein said substance has an average particle diameter ranging from 0.01 to 50 μm.

10. The fuel cell according to claim 8, wherein said substance is deposited in a form of slip on a surface of said at least one member.

11. The fuel cell according to claim 1, wherein said substance is an oxide.

12. The fuel cell according to claim 11, wherein said oxide is at least one oxide selected from zirconia, titania, alumina and ferrite.

13. A molten carbonate fuel cell which comprises;

a unit cell comprising an electrolyte body formed of a porous body impregnated therein with a mixed carbonate containing lithium carbonate and at least one kind of carbonate selected from potassium carbonate and sodium carbonate, a cathode disposed on one main surface of said electrolyte body, and an anode disposed on the other main surface of said electrolyte body;

corrugated collector plates, each disposed on a surface of said anode and on a surface of said cathode; and interconnectors, each disposed on a surface of each of said collector plates;

wherein a substance which is capable of reacting with the lithium carbonate in said mixed carbonate at an operation temperature of the fuel cell thereby to produce a solid body of lithium composite is deposited on a surface of at least one member selected from said collector plate and said interconnector.

14. The fuel cell according to claim 13, wherein said electrolyte further contains an alkaline earth carbonate.

15. The fuel cell according to claim 13, wherein said at least one member is formed of stainless steel.

16. The fuel cell according to claim 15, wherein said stainless steel is formed of a composition comprising 10 to 27 wt % of Cr, 7.0 to 28 wt % of Ni, not more than 0.08 wt % of Co, not more than 2.0 wt % of Mn, not more than 1.5 wt % of Si and the balance of Fe, and containing not more than 0.1 wt % of unavoidable impurities.

17. The fuel cell according to claim 13, wherein said substance is deposited on a surface of said interconnector which is contacted with said collector plate where an oxidizer gas is allowed to flow.

18. The fuel cell according to claim 13, wherein said substance is deposited on a surface of said at least one member at a ratio ranging from 0.5 to 100 mg/cm$^2$, based on the weight per unit area of said at least one member.

19. The fuel cell according to claim 13, wherein said substance is an oxide.

20. The fuel cell according to claim 19, wherein said oxide is at least one oxide selected from zirconia, titania, alumina and ferrite.

* * * * *